United States Patent Office.

JOSEPH M. LOEWENSTEIN, OF NEW ORLEANS, LOUISIANA.

Letters Patent No. 108,369, dated October 18, 1870.

IMPROVEMENT IN FERTILIZING-COMPOUNDS.

The Schedule referred to in these Letters Patent and making part of the same

*To all whom it may concern:*

Be it known that I, JOSEPH M. LOEWENSTEIN, of New Orleans, in the parish of Orleans and State of Louisiana, have invented a new and useful Improvement in Fertilizing-Compound; and I do hereby declare that the following is a full, clear, and exact description of the same.

My invention relates to fertilizing-compounds, having night-soil for their basis, and consists in an improved composition formed of night-soil, pulverized unslaked lime, and sulphuric acid, applied together and combined in the particular manner hereinafter described.

I take the night-soil of average fluidity and thoroughly intermix therewith about double the quantity, by measure, of pulverized unslaked lime. I immediately subject the mixture to pressure until the superfluous liquid is expelled therefrom, and the mixture brought to a condition which will admit of ready manipulation. It is then shoveled and pulverized into a friable mass. By this time, the action of the lime upon the animal matter will manifest itself unmistakably by the odor of the escaping ammonia. At this stage of my process, I apply dilute sulphuric acid, to fix the free ammonia, and to arrest the further action of lime by the formation of sulphate of lime; but I do not limit myself as to the relative quantity of dilute sulphuric acid which I employ.

The relative quantity of the sulphuric acid will depend upon its strength, and somewhat upon the character of the fæces which form the night-soil, but I preferably apply it as fast as it can be mixed in with the lime and excrement, and continue so to do until the lime has apparently ceased its action, and the ammonia appears no longer to be escaping.

Having thus described all that is necessary to a full understanding of my invention,

What I esteem to be new, and desire to protect by Letters Patent, is—

A fertilizing-compound, prepared in the manner described, from night-soil, pulverized unslaked lime, and sulphuric acid.

J. M. LOEWENSTEIN.

Witnesses:
   A. DE SOLU,
   S. ROSENTHAL.